United States Patent Office 3,245,866
Patented Apr. 12, 1966

3,245,866
VITREOUS SPHERES OF SLAG AND SLAG-LIKE MATERIALS AND UNDERGROUND PROPPANTS
Charles W. Schott, 4769 Barone Drive, Pittsburgh, Pa.
No Drawing. Filed Nov. 24, 1961, Ser. No. 154,880
4 Claims. (Cl. 161—168)

This invention relates to vitreous spheres of slag and slag-like materials and underground proppants and particularly to high strength spheres of slag. This application is a continuation-in-part of my copending application Serial No. 804,593, filed April 7, 1959.

There has long been a demand for high strength spheres of vitreous slag and slag-like materials for use as packing material for chemical reaction towers, as porous load supporting beds, as corrosion resistant rollers and for various other purposes. There has in addition been a very real need for an underground proppant for use in oil and gas wells and the like to provide a path of fluid flow in a fractured formation. Various materials have been used with varying degrees of success. For example, graded sand has been used but it lacks sphericity and has no strength in larger sizes. Walnut shells and aluminum shot have been used but they tend to flatten out. Glass spheres have heretofore been made in various ways but the products have always lacked the property of high strength. Such spheres in the form of solid non-porous spheres have generally had compressive strengths less than 10,000 lbs. per square inch and accordingly were of limited usefulness. Due to this compressive strength limitation such prior spheres were never seriously considered for underground proppant uses. In the form of cellular spheres with an imperforate outer shell, such materials had little or no strength.

I have discovered an underground proppant of slag and slag-like materials, such as metallurgical slags for example blast furnace slags, etc., having a generally spherical shape, compressive strengths in excess of 15,000 lbs. per square inch and as high as 150,000 lbs. per square inch and adapted for use as underground proppants.

I have found that solid spheres of slag-like materials having the high strength needed for underground proppants can be produced by heating as bath of slag or slag-like material to a temperature above the melting point (preferably about 200° C., above the melting point) but at a temperature such that the bubbling of gas in the vitreous material has either not begun or has ceased, then quenching from such temperature in a fluid at a temperature below about 500° C.

By the term "solid" in this specification and in the claims I mean a particle which is generally non-cellular and non-fissured and is enclosed with an imperforate surface skin.

I have found that the quenching fluid may be a solid or a liquid preferably having a viscosity greater than water but that water along cannot be used. At such temperatures the slag ordinarily will have a viscosity under 5 poises. It is important to have the temperature sufficiently high to prevent formation of wool or stringy particles and to assure clean spherical particles.

I have found that the higher the temperature from which the vitreous material is quenched and the higher the silica content, the higher the compressive strength will be. I have found that for high strength materials it is necessary to quench from a temperature not less than 200° C. above the melting point.

The practice of my invention will be more clearly understood by reference to the following examples:

EXAMPLE I

Silico manganese slag was tapped into a runner at 1950° C. The slag composition was

| | |
|---|---|
| $SiO_2$ | 39.19 |
| $Al_2O_3$ | 24.82 |
| MgO | 6.58 |
| CaO | 13.01 |
| MnO | 12.93 |
| BaO | 3.51 |

It was spheroidized by a rotary disc type impeller rotating in the bath of molten slag. Spheroidization began at about 1750° C. and was stopped at 1625° C. The spheres thrown by the impeller were quenched in a static bed of 60 mesh dry carbon flour. The quenched beads were collected and separated into three groups and compressive strengths were determined from the groups as follows:

| Mesh: | Average strength, p.s.i. |
|---|---|
| 6 to 8 | 16,219 |
| 8 to 12 | 18,550 |
| 12 to 20 | 23,900 |

The compressive strengths were obtained by placing the spheres between two hardened steel plates (Rockwell C hardness of 25) and exerting the compressive force on said plates to obtain substantially point contact on the sphere. The spheres were then placed in typical well strata in test cells and compared with conventional proppants. The results appear in Table I.

*Table I*

| | Well identification | Well location | Depth (ft.) | Core type | Proppant size (mesh) | Proppant conc. (lb./gal.) | Fracture flow capacity (md.-ft.) |
|---|---|---|---|---|---|---|---|
| Test I: | | | | | | | |
| Slag spheres | Tresner No. 20 | Sublette Cty. Wyoming. | 1,760 | Med. Hard | 6 to 8 | 1.25 | 150,000 |
| Youngstown sand | do | do | 1,760 | do | 4 to 8 | 2.0 | 30,000 |
| Test II: | | | | | | | |
| Slag spheres | Union Pacific | Patrick Draw Area | 5,200 | do | 8 to 12 | 7 | 125,000 |
| Ottawa sand | do | do | 5,200 | do | 10 to 20 | 7 | 10,000 |
| Walnut shells | do | do | 5,200 | do | 8 to 12 | 1 | 16,000 |

EXAMPLE II

A second group of spheres were made from an aluminosilicate slag of the following composition:

| | |
|---|---|
| CaO | 23.00 |
| $CaF_2$ | 4.00 |
| MgO | 10.25 |
| $SiO_2$ | 57.50 |
| $Al_2O_3$ | 4.25 |

The slag was tapped from a bath at 1775° C. into a runner and was formed into spheres as in Example I. The slag at the beginning of spheroidization was at a temperature of about 1675° C. and spheroidization was stopped when the temperature reached 1600° C. The temperatures were taken with an optical pyrometer. The spheres were quenched in a 10% aqueous starch solution. The spheres were collected and sized into groups having compressive strengths determined as follows:

| Mesh: | Average strength, p.s.i. |
|---|---|
| 6 to 8 | 36,210 |
| 8 to 12 | 37,540 |
| 12 to 20 | 56,195 |

These spheres were tested in typical well test cell structures and compared with conventional proppants as set out in Table II.

*Table II*

| Core Sample | Formation | Depth equivalent, over burden pressure (p.s.i.) | Propping Agent | | Concentration | | Fracture in flow capacity (md.-ft.) | Remarks |
|---|---|---|---|---|---|---|---|---|
| | | | Type | Size, U.S. Sieve Series (mesh) | Particles, per sq. in. | Lb./gal. fracture | | |
| No. 1 | Tresner sand | 1,760 | Dowell sand | 8-12 | 40 | 3.5 | 16,000 | Moderately embedded; moderately crushed. |
| | | | do | 8-12 | 50 | 4.5 | 10,000 | Do. |
| | | | Alumino-silicate slag spheres. | 8-12 | 40 | 3.5 | 54,000 | Moderately embedded; partially crushed. |
| | | | Rounded walnut shells. | 8-12 | 20 | 0.8 | 25,000 | Slightly embedded; slightly pancaked. |
| No. 2 | Lower Albany dolomite. | 2,900 | Ottawa sand | 10-20 | 48 | 2.0 | 12,000 | Moderately embedded; moderately crushed. |
| | | | Dowell sand | 8-12 | 24 | 2.0 | (<100) | Slightly embedded; severely crushed. |
| | | | Alumino-silicate slag spheres. | 8-12 | 24 | 2.0 | 170,000 | Slightly embedded; moderately crushed. |
| | | | Rounded walnut shells. | 8-12 | 20 | 0.8 | 31,000 | Slightly embedded; slightly pancaked. |

The foregoing tables show that the proppants of this invention permit a fracture flow capacity far greater than that permitted by any conventional proppants. The fracture flow capacity is recorded in millidarcy feet of flow (md.-ft.). This is a well recognized method in the oil industry of determining the effectiveness of propping agents. It is determined by multiplying the permeability in darcys by the width of the fracture in which the propping agent is placed. High fracture flow capacities mean larger recoveries from the fractured area and is of utmost significance to petroleum and gas recovery.

They have, in addition to providing this greater fracture flow capacity, other highly desirable characteristics. They are of uniform graded size and spherical shape. They are resistant to chemical attack by the ordinary corrosion agents to be found in soils and underground structures. Finally they are of more uniform compressive strength and density and do not deteriorate with the formation of undesirable chemical by-products.

I have treated basic blast furnace slag by the process set out in both Examples I and II by heating to between 1500° C. to 2100° C. I have found, however, that the quench must be carried out in fluid oleaginous compositions such as mineral oil, starch solutions (from about 1% to 50% starch in water) soap solutions, similar aqueous solutions of high viscosity materials or in fluid-like beds of finely divided solids such as acetylene black, graphite, carbon, etc.

I have found that similar results may be obtained on other slags and refractory materials by heating the material to an elevated temperature about 200° C. or more above the normal melting point, as, for example, in the case of iron blast furnace slag, in the area of from 1500° C. to 2100° C. and holding the molten material at the elevated temperature until equilibrium with the atmosphere above the bath has been reached and no further gas evolution is obtained. I have used, in the case of slags, both oxidizing and reducing atmospheres as well as normal atmospheres to aid in controlling the condition of the bath. I have found that this molten material may then be spheroidized at these elevated temperatures of 1500° C. to 2100° C. by one of the methods disclosed in my copending application, Serial No. 775,- 547, filed November 21, 1958, and now U.S. Patent 3,148,045, or by any other method of spheroidizing such as by striking with a rotating disc, passing through a screen, blowing from a bath, aspirating from a stream or bath, etc.

I have found that water alone cannot be used as the quench medium at any temperature within the practice of my invention. Apparently, the high temperatures from which quenching must be carried out in order to achieve my results cause excessive strains when the material is quenched in water or for some reason the water fails to properly remove the heat. In any event, all attempts to quench in water have resulted in failures. On the other hand, aqueous solutions of water glass, aqueous solutions of starch such as cornstarch, aqueous solutions of soap and aqueous solutions or dispersions of certain water soluble organic materials such ethylene glycol have produced satisfactory quenching.

The slag or slag-like proppants according to this invention must have a density less than about 2.6 gm./cc. in order that they may properly be suspended in conventional fracturing fluids which carry the proppant into the strata to be supported. The slag proppants are chemically inert at 250° F. at pH values between about 3.0 and 11.0. Resistance to chemical attack is a necessary characteristic in order to prevent attack by soil acid and sub-surface corrosive agents such as brine and the like. The vitreous slag proppants of this invention are physically stable at temperatures of 250° F. and are not softened, spalled or otherwise deleteriously effected below this temperature. In addition, the slag propping agents of this invention are of selected homogeneous sizes with smooth surfaces generally spherical shape and of high compressive, strength, all necessary for satisfactory propping action.

In the foregoing specification, I have set out certain preferred practices and embodiments of my invention. However, it will be evident that the invention may be otherwise embodied within the scope of the following claims.

I claim:
1. As an underground propping agent a solid vitreous body of slag having a generally spherical shape characterized by a density substantially equal to that of the original slag from which the body was formed, a compressive strength in excess of about 15,000 lb./in.$^2$, and resistance to chemical attack at temperatures up to about 250° F. and capable of producing a high fracture flow capacity when used as propping agents in oil or gas wells.

2. As an underground propping agent a solid vitreous body of slag having a generally spherical shape larger than 20 mesh characterized by a density substantially equal to that of the original slag from which the body was formed, a compressive strength in excess of about 15,000 lb./in.$^2$, and by resistance to chemical attack and physical deterioration at temperatures up to about 250° F. and capable of producing a high fracture flow capacity when used as propping agents in oil or gas wells.

3. As an underground propping agent a solid vitreous body of slag having a generally spherical shape larger than 20 mesh characterized by a density substantially equal to that of the original slag from which the body was formed, a compressive strength in excess of about 25,000 lb./in.$^2$, by resistance to chemical attack a pH values of 3.0 to 11.0 at temperatures up to about 250° F. and capable of producing a high fracture flow capacity when used as propping agents in oil or gas wells.

4. As an underground propping agent a solid vitreous body of aluminosilicate slag having a generally spherical shape characterized by a density substantially equal to that of the original slag from which the body was formed, a compressive strength in excess of about 25,000 lb./in.$^2$, by resistance to chemical attack at pH values of 3.0 to 11.0 at temperatures up to about 250° F. and capable of producing a high fracture flow capacity when used as propping agents in oil or gas wells.

References Cited by the Examiner

UNITED STATES PATENTS

| | | | |
|---|---|---|---|
| 2,919,471 | 1/1960 | Hechinger | 18—47.2 |
| 2,950,247 | 8/1960 | McGuire et al. | 252—8.55 |
| 3,054,139 | 9/1962 | Bartholomew et al. | 65—21 |
| 3,075,581 | 1/1963 | Kern | 166—42 |
| 3,155,162 | 11/1964 | Flickinger et al. | 166—42.1 |
| 3,155,466 | 11/1964 | Grutter et al. | 65—21 |

ALEXANDER WYMAN, *Primary Examiner.*

JOSEPH REBOLD, *Examiner.*